United States Patent

Kelly

(10) Patent No.: US 9,907,127 B2
(45) Date of Patent: Feb. 27, 2018

(54) CONVERTER AND METHOD OF OPERATING A CONVERTER FOR SUPPLYING CURRENT TO A LIGHT EMITTING MEANS

(71) Applicant: Tridonic GmbH & Co KG, Dornbirn (AT)

(72) Inventor: Jamie Kelly, North Shields (GB)

(73) Assignee: Tridonic GmbH & Co KG, Dornbirn (AT)

( * ) Notice: Subject to any disclaimer, the term of this patent is extended or adjusted under 35 U.S.C. 154(b) by 1 day.

(21) Appl. No.: 14/915,752

(22) PCT Filed: Sep. 8, 2014

(86) PCT No.: PCT/AT2014/050198
§ 371 (c)(1),
(2) Date: Mar. 1, 2016

(87) PCT Pub. No.: WO2015/031930
PCT Pub. Date: Mar. 12, 2015

(65) Prior Publication Data
US 2016/0219660 A1    Jul. 28, 2016

(30) Foreign Application Priority Data
Sep. 6, 2013 (EP) .................................. 13183316

(51) Int. Cl.
*H05B 33/08* (2006.01)
*H02M 3/158* (2006.01)

(52) U.S. Cl.
CPC ........ *H05B 33/0815* (2013.01); *H02M 3/158* (2013.01); *H05B 33/0842* (2013.01)

(58) Field of Classification Search
CPC ............ H05B 33/0815; H05B 33/0845; H05B 33/0851; H05B 33/0842; H05B 33/0812;
(Continued)

(56) References Cited

U.S. PATENT DOCUMENTS

2009/0115341 A1* 5/2009 Nijhof ................ H05B 41/2881
315/246
2009/0273301 A1  11/2009 De Anna et al.
(Continued)

OTHER PUBLICATIONS

International Search Report and Written Opinion issued in connection with corresponding International Application No. PCT/AT2014/050198 dated Jan. 15, 2015.
(Continued)

*Primary Examiner* — Kretelia Graham
*Assistant Examiner* — Borna Alaeddini
(74) *Attorney, Agent, or Firm* — H.T. Than Law Group

(57) ABSTRACT

A converter for supplying current to a light emitting means (8, 9), the converter (6, 7; 10; 90; 100) comprising: an input (11, 12) configured to receive a direct current supply voltage; 10 at least a first controllable switch (21; 41, 43) electrically connected between the input (11, 12) and an inductor (13), and a second controllable switch (22; 42, 44) electrically connected between the input (11, 12) and the inductor (13); a first diode (14) and a second diode (15) connected in series; a first capacitance (16) connected in parallel with the first diode (14) and a second capacitance (17) connected in parallel with the second diode (15); the inductor (13) having a terminal coupled to the at least one controllable switch (21, 22; 41-44) and another terminal coupled to an anode of the first diode (14) and a cathode of the second diode (15); and a control device (20) to control the first controllable switch (21; 41, 43) and the second controllable switch (22; 42, 44), wherein the control device (20) is configured to adjust a switching frequency of the first controllable switch (21; 41, 43) and of the second controllable switch (22; 42, 44) to set an output current of the converter (6, 7; 10; 90; 100).

12 Claims, 7 Drawing Sheets

(58) Field of Classification Search
CPC .............. H05B 33/083; H05B 33/0809; H05B 33/0824; H05B 37/02; H05B 39/044; H02M 3/158; H02M 3/33507; H02M 2001/0058; H02M 7/4826
See application file for complete search history.

(56) References Cited

U.S. PATENT DOCUMENTS

| | | |
|---|---|---|
| 2010/0045208 A1 | 2/2010 | Siessegger et al. |
| 2011/0140619 A1 | 6/2011 | Lin et al. |
| 2011/0309762 A1* | 12/2011 | Deppe .................. H02M 3/337 315/219 |
| 2012/0014153 A1 | 1/2012 | Paul et al. |
| 2013/0342119 A1* | 12/2013 | Malboeuf Joset . H05B 33/0809 315/193 |

OTHER PUBLICATIONS

European Search Report issued in connection with the corresponding European Patent Application No. 13 18 3316 dated Feb. 11, 2014.

\* cited by examiner

CONVERTER AND METHOD OF OPERATING A CONVERTER FOR SUPPLYING CURRENT TO A LIGHT EMITTING MEANS

TECHNICAL FIELD

The invention relates to converters for feeding current to a light emitting means and to methods of controlling such converters. The invention relates in particular to converters which are operative as direct current (DC)/DC converters.

BACKGROUND

Novel light sources such as light sources based on light emitting diodes (LEDs) or discharge lamps become increasingly more popular. Converters for such light sources are operative to feed an output current to a light-emitting means, e.g. to an inorganic or organic light emitting diode (LED).

It is desirable that a converter can be used for operating in conjunction with a wide variety of light emitting means. For illustration, LED-based light emitting means may have a wide variety of different load voltages, depending on the types of LEDs which are used and the way in which the LEDs are interconnected. In order to accommodate the different load voltages, closed-loop control schemes may be used in which an output current of the converter is measured and used in a feedback loop. The measurement of the output current may add to the complexity and costs of the converter, which is undesirable.

SUMMARY

There is a continued need in the art for devices, systems and methods in which a driver is configured to supply a current which does not show a pronounced dependence on load voltage. There is in particular a need for devices, systems and methods in which the driver has a topology which allows the output current to be controlled without requiring the output current to be measured.

According to embodiments, a driver circuit for supplying current to a light emitting means is configured as a DC/DC converter. The converter comprises a first diode and a second diode in a series connection, and an inductor coupled to an anode of the first diode and a cathode of the second diode. At least one controllable switch is provided to control a potential at a terminal of the inductor. The output current may be controlled in an open-loop control by controlling a switching frequency of the at least one controllable switch, for example.

According to embodiments, a converter and a method as defined by the independent claims are provided. The dependent claims define features of further embodiments.

A converter for supplying current to a light emitting means according to an embodiment comprises an input configured to receive a direct current supply voltage, a first controllable switch electrically connected between the input and an inductor, and a second controllable switch electrically connected between the input and the inductor, a first capacitance connected in parallel with the first diode and a second capacitance connected in parallel with the second diode, the inductor having a terminal coupled to the at least one controllable switch and another terminal coupled to an anode of the first diode and a cathode of the second diode, and a control device to control the first controllable switch and the second controllable switch wherein the control device is configured to adjust a switching frequency of the first controllable switch and of the second controllable switch to set an output current of the converter.

A converter for supplying current to a light emitting means comprises an input configured to receive a direct current supply voltage. The converter comprises at least one controllable switch coupled to the input. The converter comprises a first diode and a second diode connected in series. The converter comprises an inductor having a terminal coupled to the at least one controllable switch and another terminal coupled to an anode of the first diode and a cathode of the second diode.

A cathode of the first diode may be coupled to a first output terminal of the converter. An anode of the second diode may be coupled to a second output terminal of the converter. The first output terminal and the second output terminal may be connected to a light emitting means.

A light emitting means may be connected to the first output terminal and the second output terminal.

The converter may be configured such that current is transferred between the inductor and the light emitting means via at least one of the first diode and the second diode.

The converter may comprise a first capacitance connected in parallel with the first diode and a second capacitance connected in parallel with the second diode. The first capacitance may comprise a first capacitor. The second capacitance may comprise a second capacitor. The first capacitor and the second capacitor may have equal capacitances.

The second capacitance may be configured to introduce a time delay before the second diode starts to conduct after a reversal of a current direction in the inductor. This enhances the current transfer between the inductor and the light emitting means.

The second capacitance may be configured to drive a discharge current of the second capacitance through the inductor until the second diode starts to conduct after the reversal of the current direction in the inductor. The first capacitance may be charged while the second capacitance is being discharged.

The first capacitance may be configured to introduce a time delay before the first diode starts to conduct after another reversal of the current direction in the inductor. This enhances the current transfer between the inductor and the light emitting means.

The at least one controllable switch may comprise a first controllable switch connected between the input and the inductor, and a second controllable switch connected between the input and the inductor.

The first controllable switch may be connected between a first input terminal of the converter and the terminal of the inductor. The second controllable switch may be connected between a second input terminal of the converter and the terminal of the inductor. In operation of the converter, the first input terminal may be at a first potential and the second input terminal may be at a second potential which is lower than the first potential.

The converter may be a half-bridge resonance converter. The first controllable switch and the second controllable switch may respectively be controlled to alter a potential at the terminal of the inductor to transfer energy from the input to the output of the converter. The converter may operate in a resonant mode. The control device may be configured to adjust a switching frequency of the first controllable switch and of the second controllable switch to set an output current of the converter The converter may comprise a control device to control the first controllable switch and the second controllable switch to set an output current of the converter.

The control device may be configured to perform an open loop control to set the output current of the converter.

The control device may be configured to adjust a switching frequency of the first controllable switch and of the second controllable switch as a function of a target output current.

The control device may be configured to adjust a switching frequency of the first controllable switch and of the second controllable switch as a function of both the target output current and the DC supply voltage.

The control device may be configured to adjust a switching frequency of the first controllable switch and of the second controllable switch as a function of the target output current and the load voltage. The control device may be configured to adjust a switching frequency of the first controllable switch and of the second controllable switch as a function of the target output current, the DC supply voltage and the load voltage.

The control device may be configured to increase the switching frequency to decrease the output current of the converter, while the target output current is greater than a threshold. The converter may operate in a resonant mode while the target output current is greater than a threshold.

The control device may be configured to selectively control the first controllable switch and the second controllable switch in a pulsed manner when a target output current is below a threshold, i.e. for dim levels that are less than a dim level threshold. When the target output current is below the threshold, the control device may be configured to adjust a length of a first time interval in which it switches the first and second controllable switches and/or a length of a second time interval in which it does not switch the first and second controllable switches as a function of the dim level. The control device may be configured to increase on-duration linearly with the target output current. Undesired color changes may be prevented by using the pulsed operation for smaller target output currents.

The control device may be configured to respectively switch on the first controllable switch or the second controllable switch before a current in the inductor has a zero crossing.

The converter may comprise a third capacitance connected in parallel with the first controllable switch and a fourth capacitance connected in parallel with the second controllable switch. The third capacitance and the fourth capacitance may respectively limit the power dissipation as the first switch and the second switch are respectively switched on.

The converter may comprise a capacitor connected between the first input terminal and the first output terminal. A diode may be connected in parallel with the capacitor.

The converter may comprise another capacitor connected between the second input terminal and the second output terminal. Another diode may be connected in parallel with the other capacitor.

The converter may comprise a capacitor connected between the first output terminal and the second output terminal.

The converter may comprise a capacitor connected between the first input terminal and the second input terminal.

A light source according to an embodiment comprises a converter according to an embodiment and a light emitting means connected to an output of the converter.

A system according to an embodiment comprises a voltage supply bus, a converter according to an embodiment, and a light emitting means. The input of the converter is connected to the voltage supply bus. The light emitting means is connected to an output of the converter.

The light emitting means may comprise at least one LED. The light emitting means may comprise at least one inorganic LED. The light emitting means may comprise at least one organic LED (OLED).

The system may comprise an AC/DC converter connected to the bus. The AC/DC converter may have an input to receive an AC voltage and may be configured to generate the DC supply voltage on the supply bus.

According to another embodiment, a method of operating a converter for supplying current to a light emitting means is provided.

The converter comprises an input to receive a direct current supply voltage, at least one controllable switch coupled to the input, a first diode and a second diode connected in series, and an inductor having a terminal coupled to the at least one controllable switch and another terminal coupled to an anode of the first diode and a cathode of the second diode. The at least one controllable switch is controlled to transfer current between the inductor and the output through at least one of the first diode and the second diode.

Additional features of the method which may be implemented in embodiments and the effects attained thereby correspond to the features and effects of the devices of embodiments.

For illustration, the at least one controllable switch may comprise a first controllable switch and a second controllable switch. The method may comprise controlling a switching frequency of the first controllable switch and of the second controllable switch to set an output current of the converter.

The switching frequency may be controlled in an open control loop which does not require a current measurement of the output current to be performed.

The switching frequency may be adjusted as a function of a target output current.

The switching frequency may be adjusted as a function of both the target output current and the DC supply voltage.

The switching frequency may be adjusted as a function of the target output current and the load voltage. The switching frequency may be adjusted as a function of the target output current, the DC supply voltage and the load voltage.

The switching frequency may be increased to decrease the output current of the converter, while the target output current is greater than a threshold.

The first controllable switch and the second controllable switch may be operated in a pulsed manner when the target output current is less than the threshold.

In the method, the converter may have any one of the various configurations described for converters of embodiments.

For illustration, the converter may have a first capacitance connected in parallel with the first diode. The converter may have a second capacitance connected in parallel with the second diode. The method may comprise discharging the second capacitance to introduce a time delay before the second diode starts to conduct after a reversal of a current direction in the inductor. The method may comprise discharging the first capacitance to introduce a time delay before the first diode starts to conduct after another reversal of the current direction in the inductor.

The method may be performed by the converter according to any one of the various embodiments. The control device of the converter may control the switching of the at least one controllable switch.

In any one of the various embodiments, the first controllable switch and/or the second controllable switch respectively may comprise a controllable power switch. The first controllable switch and/or the second controllable switch may comprise a transistor. The first controllable switch and/or the second controllable switch may comprise a semiconductor switch having an isolated gate electrode. The at least first controllable switch and/or the second controllable switch may comprise a field effect transistor (FET). The at least one controllable switch may comprise a metal oxide semiconductor field effect transistor (MOSFET).

The invention also relates to a method of operating a converter for supplying current to a light emitting means, wherein the converter comprises an input to receive a direct current supply voltage, at least one controllable switch coupled to the input, a first diode and a second diode connected in series, a first capacitance connected in parallel with the first diode and a second capacitance connected in parallel with the second diode, and an inductor having a terminal coupled to the at least one controllable switch and another terminal coupled to an anode of the first diode and a cathode of the second diode, wherein the method comprises: controlling the switching frequency of the at least one controllable switch to transfer current between the input and the output through the inductor and at least one of the first diode and the second diode.

In devices, methods and systems according to embodiments, a converter is configured as a DC/DC converter is used for supplying current to a light emitting means. The converter provides inherent robustness against short-circuiting.

The output current may be controlled by adjusting the switching frequency. Control of the output current may be implemented as an open loop control which does not require the output current to be measured.

BRIEF DESCRIPTION OF THE SEVERAL VIEWS OF THE DRAWINGS

Embodiments of the invention will be described in detail with reference to the drawings in which like reference numerals designate like elements.

DETAILED DESCRIPTION OF EMBODIMENTS

Exemplary embodiments of the invention will now be described in detail with reference to the drawings.

According to embodiments of the invention, a driver circuit for supplying current to a light emitting means is configured as a DC/DC converter. The converter comprises plural diodes connected in series between the output terminals of the converter. An inductor is connected to a cathode of one of the diodes and an anode of another one of the diodes. At least one controllable switch is switched between an on-state and an off-state to adjust a potential at a terminal of the inductor and to provide an output current to the light emitting means by transferring current between the inductor and the output.

Figure 1:
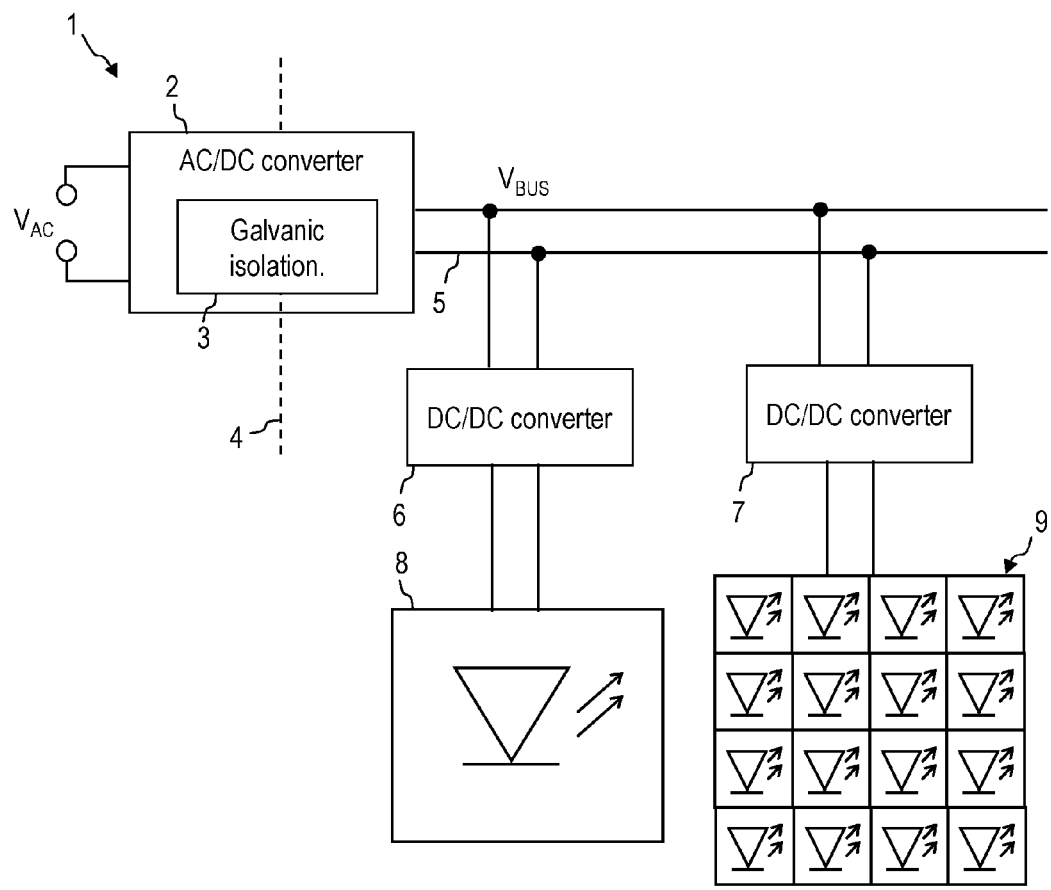
FIG. 1 is a diagram of a system comprising a converter according to an embodiment.

FIG. 1 is a diagram of a system 1 according to an embodiment. The system 1 includes an AC/DC converter 2 having an input coupled to an alternating current (AC) voltage. The AC/DC converter has an output coupled to a supply bus 5.

The system 1 comprises a converter 6 according to an embodiment, which will be explained in more detail with reference to FIG. 2 to FIG. 12. An input of the converter 6 is connected to the supply bus 5. An output of the converter 6 is connected to a light emitting means 8. More than one converter with associated light emitting means may be connected to the supply bus 5.

For illustration, at least one further converter 7 may be provided. An input of the further converter 7 is connected to the supply bus 5. An output of the further converter 7 is connected to a further light emitting means 9. The further converter 7 may also have any one of the configurations which will be explained in more detail with reference to FIG. 2 to FIG. 12.

The supply bus 5 may be configured as an extra-low voltage (ELV) as defined in IEC Standard 61140, Protection against electric shock, Third edition, 2002, for example. The voltage on the supply bus 5 may be less than 120 V. The supply bus 5 and the converters 6, 7 connected thereto may form a Separated or safety extra-low voltage (SELV) system. The AC/DC converter 2 may comprise a galvanic isolation 3. The galvanic isolation 3 may be implemented by a transformer. The galvanic isolation 3 may define a galvanic isolation barrier 4 which separates the ELV system from higher voltages.

The light emitting means 8 and the further light emitting means 9 may respectively comprise at least one LED. The light emitting means 8 and the further light emitting means 9 may respectively comprise at least one inorganic LED or organic LED (OLED). The converter 6 and the further converter 7 may respectively operate as a driver circuit for a light emitting means comprising at least one OLED.

The light emitting means 8 and the further light emitting means 9 may have configurations which are different from one another. For illustration, the light emitting means 8 and the further light emitting means 9 may comprise different numbers of LEDs. The light emitting means 8 and the further light emitting means 9 may have different load voltages. The converter 6 and the further converter 7 may have identical configurations to feed current to the light emitting means connected to their respective output, because the current exhibits only a weak dependence on the load voltage, as will be explained in more detail with reference to FIG. 2 to FIG. 12.

Figure 2:
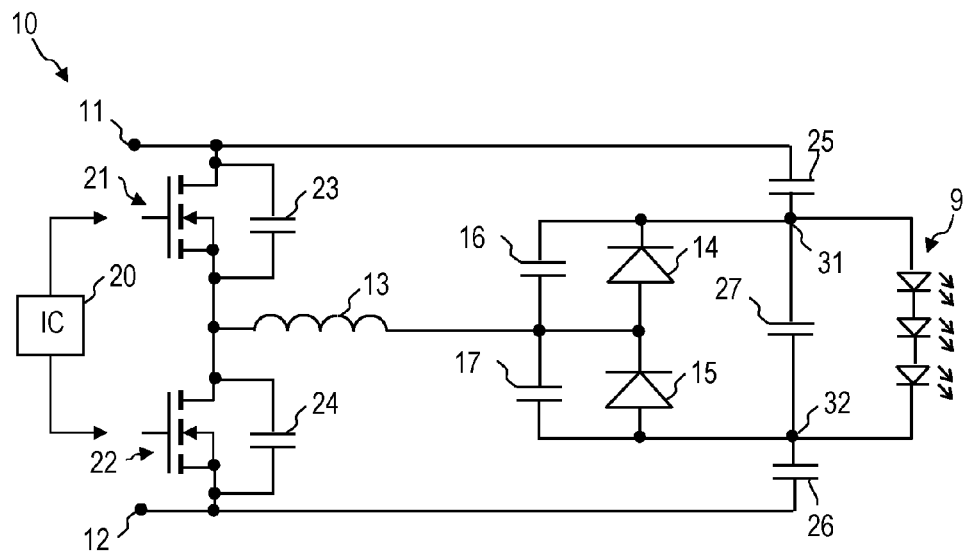
FIG. 2 is a circuit diagram of converter according to an embodiment.
Figure 3:
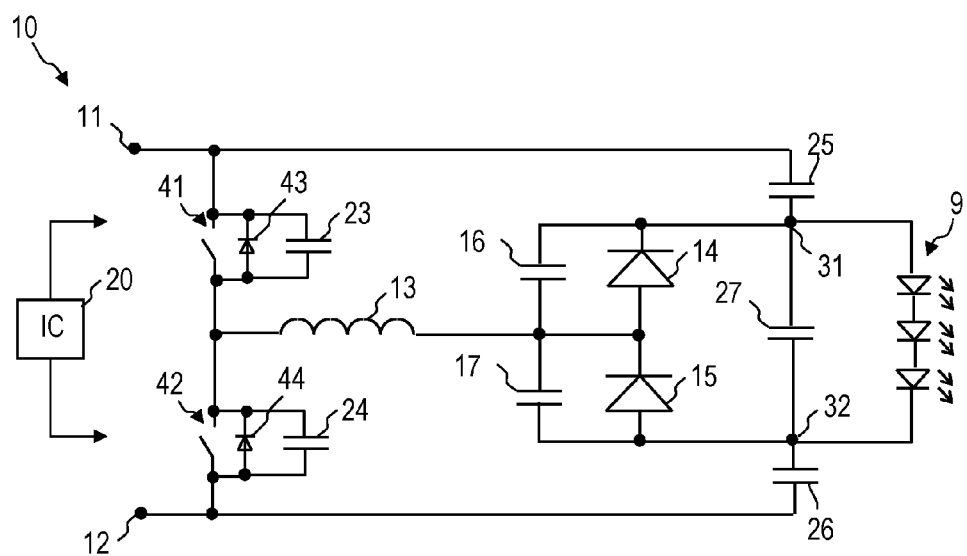
FIG. 3 to FIG. 6 are circuit diagrams of the converter according to an embodiment for illustrating operation of the converter.

FIG. 2 is a circuit diagram of a converter 10 according to an embodiment. The converter 10 is a DC/DC converter.

The converter 10 is implemented as a half-bridge resonance converter. The converter 10 may operate in a resonant mode.

The converter 10 comprises an input having a first input terminal 11 and a second input terminal 12. In operation of the converter, the first input terminal 11 and the second input terminal 12 are connected to the supply bus 5. A potential at the first input terminal 11 is higher than a potential at the second input terminal 12.

The converter 10 comprises an output having a first output terminal 31 and a second output terminal 32. In operation of the converter 10, a light emitting means 9 is connected to the first output terminal 31 and the second output terminal 32. The converter 10 is operative to feed current to the light emitting means 9.

The converter 10 comprises a first diode 14 and a second diode 15 in a series connection. An anode of the first diode 14 is connected to an inductor 13. A cathode of the first diode 14 is coupled to the first output terminal 31 such that an inductor current may be transferred from the inductor 13 to the first output terminal 31 via the first diode 14.

A cathode of the second diode 15 is connected to the inductor 13. An anode of the second diode 14 is coupled to the second output terminal 32 such that current may be transferred from the second output terminal 32 to the inductor 13 via the second diode 15.

The converter comprises a first controllable switch 21 and a second controllable switch 22. The first controllable switch 21 and the second controllable switch 22 may respectively comprise a transistor. The first controllable switch 21 and the second controllable switch 22 may respectively comprise a transistor with isolated gate electrode. The first controllable switch 21 and the second controllable switch 22 may respectively be a field effect transistor (FET).

The first controllable switch 21 is connected between the first input terminal 11 and a terminal of the inductor 13. The second controllable switch 22 is connected between the second input terminal 21 and the terminal of the inductor 13. The other terminal of the inductor 13 is connected to the anode of the first diode 14 and the cathode of the second diode 15.

In operation of the converter 10, the first controllable switch 21 and the second controllable switch 22 are switched in an alternating fashion. A control device 20 is coupled to the first controllable switch 21 and the second controllable switch 22 to switch the first and second controllable switches 21, 22 on and off, respectively. The control device 21 may be implemented as an integrated circuit. The control device 20 may be a microprocessor, a processor, a microcontroller, a controller, or an application specific integrated circuit (ASIC) configured to switch the first controllable switch 21 and the second controllable switch 22 to their on- and off-states, respectively. The control device 20 may control gate voltages at the gates of the first controllable switch 21 and the second controllable switch 22 to switch the first controllable switch 21 and the second controllable switch 22 to their on- and off-states, respectively.

By switching the first controllable switch 21 and the second controllable switch 22 to the on-state in an alternating manner, the potential at the terminal of the inductor 13 which is connected to the first and second controllable switches 21, 22 is controlled to transfer current between the inductor 13 and the output of the converter 10 via the series connection of diodes 14, 15. As will be explained in more detail with reference to FIG. 9 and FIG. 10, the output current of the converter which is supplied to the light emitting means 9 may be controlled by controlling the switching frequency of the first controllable switch 21 and the second controllable switch 22. The switching frequency may be adjusted relative to a resonance frequency of the inductor 13 and capacitances 16, 17 to adjust the output current. As the converter 10 is implemented as a half-bridge resonance converter the converter 10 may operate in a resonant mode. The control device may adjust the switching frequency of the first controllable switch and of the second controllable switch to set an output current of the converter.

The switching frequency may be set in an open control loop, in dependence on the target output current, but without requiring a measurement of the output current to be performed. The switching frequency may also be set in closed control loop. The closed loop control may have a slow response characteristic as the topology and operation provides a robust system.

The converter 10 comprises a first capacitance 16 connected in parallel with the first diode 14. The converter 10 comprises a second capacitance 17 connected in parallel with the second diode 15. The first capacitance 16 may be formed by a first capacitor connected in parallel with the first diode 14. The second capacitance 17 may be formed by a second capacitor connected in parallel with the second diode 15.

As will be explained in more detail with reference to FIG. 3 to FIG. 7, the second capacitance 17 is charged when an inductor current in the inductor 13 has a first direction and current flows from the inductor 13 to the first output terminal 31 through the first diode 14. When the direction of the inductor current reverses such that the current has a second direction opposite to the first direction, the second capacitance 17 is discharged. This introduces a time delay before the second diode 15 starts to conduct. The time delay leads to an increase of the current that is transferred between the inductor 13 and the output of the converter 10.

Vice versa, the first capacitance 16 is charged while the inductor current in the inductor 13 has the second direction and current flows from the second output terminal 32 to the inductor 13 through the second diode 15. When the direction of the inductor current reverses again such that the current has the first direction, the first capacitance 16 is discharged. This introduces a time delay before the first diode 14 starts to conduct. The time delay leads to an increase of the current that is transferred between the inductor 13 and the output of the converter 10.

The first capacitance 16 and the second capacitance 17 act in a clamped resonant manner.

In combination with the inductor 13, the first capacitance 16 and the second capacitance 17 can be chosen such that the output current provided by the converter 10 to the light emitting means 9 only has a weak dependence on load voltage. The variation in output current over a pre-defined interval of load voltages may be kept smaller than a threshold. The first capacitance 16 and the second capacitance 17 may be selected in dependence on an inductance of the inductor 13.

The converter 10 comprises a capacitance 25 connected between a first supply rail connected to the first input terminal 11 and the first output terminal 31. The converter 10 comprises another capacitance 26 connected between a second supply rail connected to the second input terminal 12 and the second output terminal 32. The capacitance 25 may be formed by a capacitor and the other capacitance 26 may be formed by another capacitor. The capacitor providing the capacitance 25 and the other capacitor providing the other capacitance 26 may have the same configuration. The capacitance 25 and the other capacitance 26 provide capacitive decoupling between the first input terminal 11 and the first output terminal 31, and between the second input terminal 12 and the second output terminal 32, respectively. This decouples the output of the converter from the supply voltage.

A diode (not shown) may respectively be connected in parallel with the capacitance 25 and the other capacitance 26. The diodes connected in parallel with the capacitances 25, 26 may guarantee voltage clamping for operation at ELV and, in particular, SELV potentials.

A capacitor 27 may be connected between the first output terminal 31 and the second output terminal 32. The capacitor 27 may limit voltage variations at the output. Alternatively or additionally, a capacitor may be coupled between the input terminals 11, 12 for enhanced supply decoupling.

The converter 10 may comprise a third capacitance 23 connected in parallel with the first controllable switch 21. The third capacitance 23 may be formed by a third capacitor.

The third capacitance 23 is configured to limit the time-derivative of the voltage drop across the first controllable switch 21. The third capacitance 23 may limit power dissipation when the first controllable switch 21 is switched to its on-state while the inductor current in the inductor 13 is non-zero.

The converter 10 may comprise a fourth capacitance 24 connected in parallel with the second controllable switch 22. The fourth capacitance 24 may be formed by a fourth capacitor. The fourth capacitance 24 is configured to limit the time-derivative of the voltage drop across the second controllable switch 22. The fourth capacitance 24 may limit power dissipation when the second controllable switch 22 is switched to its on-state while the inductor current in the inductor 13 is non-zero.

Operation of the converter 10 will be described in more detail with reference to FIG. 3 to FIG. 7. FIG. 3 to FIG. 6 illustrate circuit diagrams of the converter 10. First and second controllable switches implemented as transistors are respectively represented by a switch 41, 42 and a diode 43, 44 connected in parallel thereto. The diodes 43, 44 are provided by the semiconductor bodies of the transistors which form the controllable switches 21, 22. The state of the switch 41, 42 is determined by the gate voltage of the transistors which form the controllable switches 21, 22. FIG. 7 shows a graph 61 representing the inductor current in the inductor 13 as a function of time FIG. 7 also shows a graph 62 representing a voltage between the terminals of the inductor 13 as a function of time, i.e., the voltage drop across the inductor 13. FIG. 7 also shows a graph 64 representing the control signals which control the states of the first and second controllable switches 21, 22.

Figure 4:
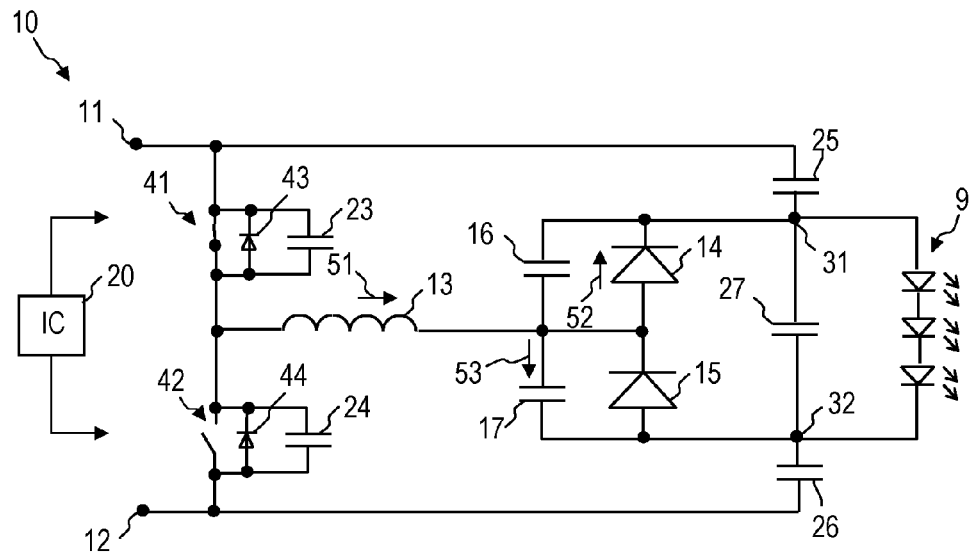

FIG. 4 shows the converter 10 in a state in which the first controllable switch is in the on-state, as represented by closed switch 41. An inductor current 51 has a first direction. Current flows from the first input terminal 11 through the first controllable switch, the inductor 13, and the first diode 14 to the first output terminal 31. A current 52 flows from the inductor 13 through the first diode 14 to the first output terminal 31.

A charging current 53 flows from the inductor 13 to the second capacitance 17 until the second capacitance 17 is charged. The second capacitance 17 is charged until the voltage at the second capacitance 17 is equal to the load voltage between the output terminals 31, 32 minus the forward voltage of the first diode 14.

When the second capacitance 17 is charged and the voltage at the second capacitance 17 is equal to the load voltage minus the forward voltage of the first diode 14, the voltage between the terminals of the inductor 13 remains substantially constant. The voltage drop across the inductor 13 is approximately equal to $(V_{Bus}-V_{load})/2$ in this state, where $V_{Bus}$ is the DC supply voltage between the input terminals 11, 12 and $V_{load}$ is the load voltage of the light emitting means 9. A magnitude of the inductor current 51 increases until the first controllable switch is switched to an off-state.

FIG. 7 illustrates the linear increase of the magnitude of the inductor current and the constant inductor voltage in interval 71. The first controllable switch is in its on-state. A control signal 65 may be output to the first controllable switch to set the first controllable switch to the on-state. The second controllable switch is in the off-state to set the path between the inductor 13 and the second input terminal 12 to a high impedance state.

With continued reference to FIG. 7, the first controllable switch is set to the off-state at the end of interval 71. The first controllable switch stops conducting. Current flows via the body of the second controllable switch forming the diode 44 for a short interval. The potential at the terminal of the inductor 13 which is connected to the first and second controllable switches is lowered, causing a drop in the voltage across the inductor 13 at the beginning of interval 72. In this state, the second capacitance 17 is initially charged such that the voltage between the terminals of the second capacitance 17 is equal to the load voltage $V_{load}$ between the output terminals 31, 32 minus the forward voltage of the first diode 14. The voltage drop across the inductor 13 is approximately equal to $-(V_{Bus}+V_{load})/2$ in this state. The inductor current through the inductor 13 decreases.

The second controllable switch is switched to its on-state before the inductor current has a zero crossing. A control signal 66 is output to the second controllable switch to set the second controllable switch to the on-state. The control signal 66 has a rising edge which occurs before the zero-crossing of the inductor current. The fourth capacitor 24 limits the time-derivative of the voltage across the second controllable switch. This decreases power losses when the second controllable switch is set to the on-state. The second controllable switch enters into conduction before the inductor current crosses zero. The first controllable switch remains in the off-state while the second controllable switch is in the on-state.

When the inductor current has its zero-crossing, i.e. when the inductor current path reverses, the second capacitance 17 is discharged. This state is shown in FIG. 5 and in FIG. 7 at interval 73.

Figure 5:
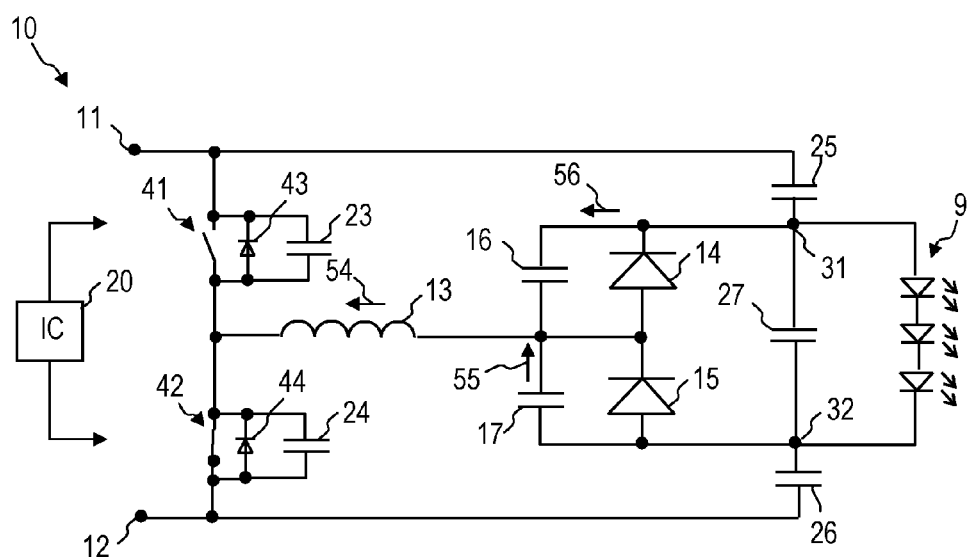

FIG. 5 shows the converter 10 when the second controllable switch is in its on-state and the second capacitance 17 is being discharged. The inductor current 54 has a second direction opposite to the first direction illustrated in FIG. 4. A discharge current 55 flows from the second capacitance 17 to the inductor 13. At the same time, the first capacitance 16 is being charged. A charging current 56 flows to the first capacitance 16.

The discharging process of the second capacitance 17 leads to a time delay before the second diode 15 enters into conduction after the inductor current reverses its direction. The voltage drop across the inductor 13, i.e. the voltage between the inductor terminal connected to the controllable switches and the inductor terminal connected to the diodes, is $-[(V_{Bus}-V_{load})/2+V_2]$, where $V_2$ is the voltage between the terminals of the second capacitance 17. This voltage $V_2$ is initially approximately equal to the load voltage $V_{load}$ and becomes 0 when the second capacitance 17 is discharged.

The inductor current continues to decrease while the second capacitance 17 is being discharged and the first capacitance 16 is being charged in interval 73.

A modulus of the voltage drop $V_L$ across the inductor decreases as the second capacitance 17 is being discharged.

At least for a fraction of interval 73, the voltage across the second capacitance 17 prevents the second diode 15 from entering into conduction.

When the second diode 15 starts to conduct, current flows from the second output terminal 32 through the second diode 15, the inductor 13 and the second controllable switch to the second input terminal 12 until the second controllable switch is set to its off-state.

Figure 6:
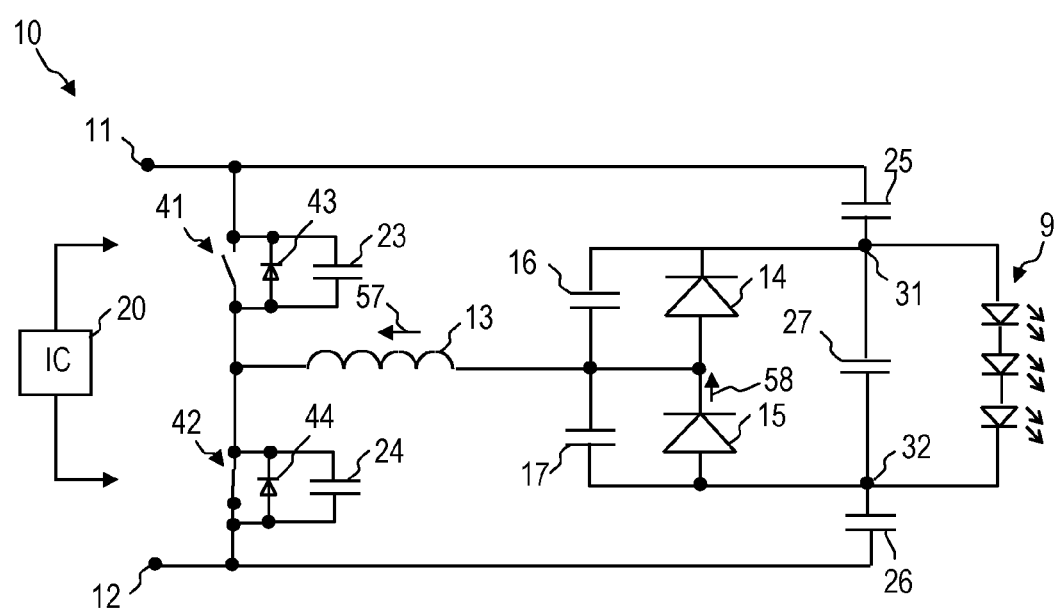
Figure 7:
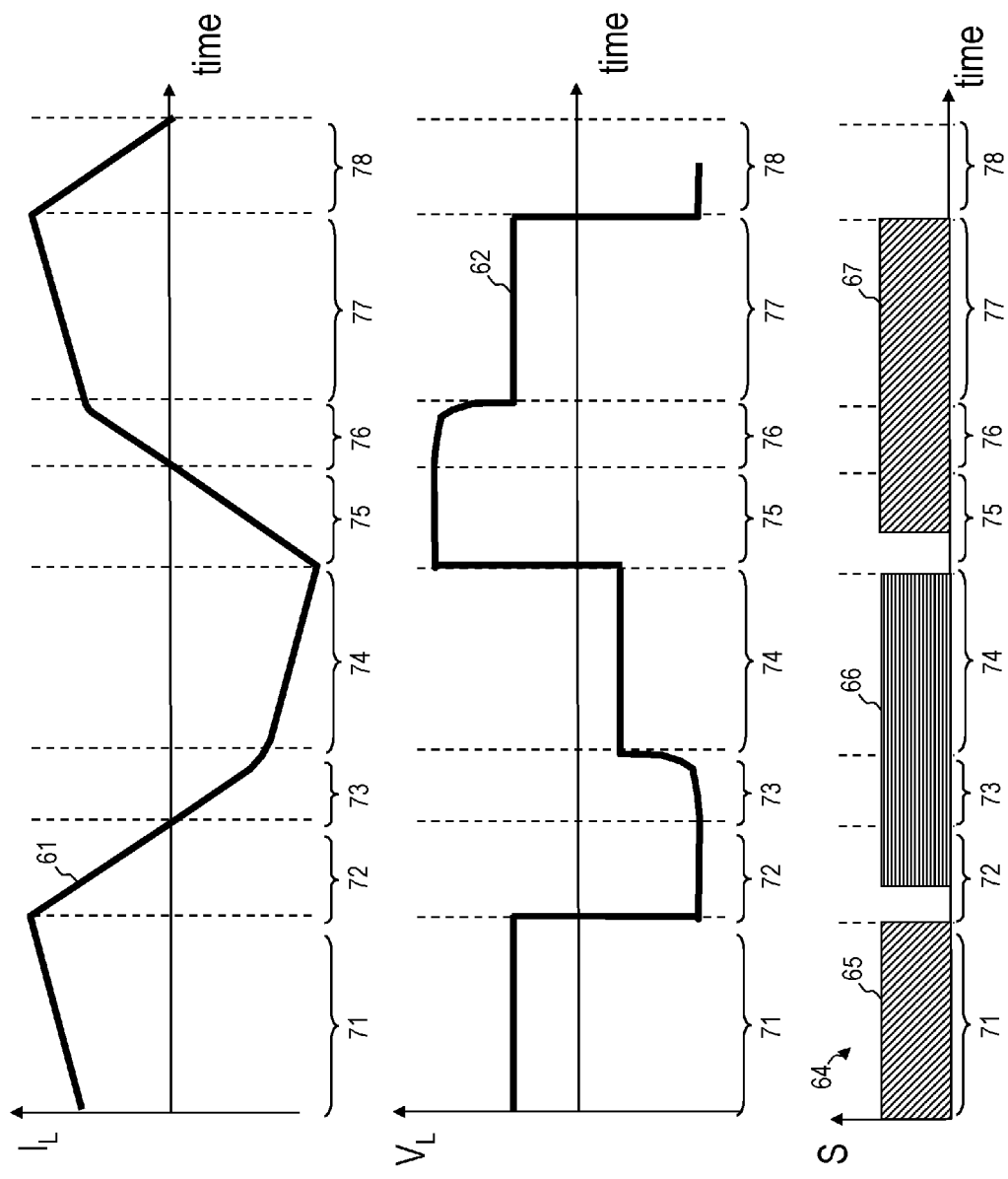
FIG. 7 shows graphs representing an inductor current and a voltage drop over an inductor of the converter according to an embodiment.

This state corresponds to interval 74 in FIG. 7 and is also illustrated in FIG. 6. The second diode 15 may start to conduct when the second capacitance 17 is substantially discharged or when the voltage between the terminals of the second capacitance 17 is less than a pre-defined threshold. A current 58 through the second diode 15 may flow through the inductor 13 and the second controllable switch to the second input terminal 12. The inductor current 57 still has the second direction. The first capacitance 16 is charged such that a voltage between the terminals of the first capacitance 16 is essentially equal to the load voltage between the output terminals 31, 32 minus the forward voltage of the first diode 14.

As can best be seen in FIG. 7, the modulus of the time-derivative of the inductor current in interval 74 is less than the modulus of the time-derivative of the inductor current in intervals 72 and 73. In a converter which does not have the second capacitance 17, the inductor current would decrease more slowly than as shown for the converter with the second capacitance 17 in FIG. 7 for intervals 72 and 73. The second capacitance 17 increases an amplitude of the inductor current, which leads to a more efficient transfer of current to the output of the converter 10. The amount of charge which is transferred to the output per switching cycle of the first and second controllable switches is increased by the second capacitance 17.

At the end of interval 74, the second controllable switch is set to the off-state.

The potential at the terminal of the inductor 13 connected to the controllable switches is increased, leading to the increase in the voltage drop $V_L$ across the inductor 13 when the second controllable switch is switched off. The voltage drop across the inductor 13 is approximately equal to $(V_{Bus}+V_{load})/2$ in this state, as illustrated for interval 75 in FIG. 7. A magnitude of the inductor current 51 increases again after the second controllable switch is switched to its off-state, as shown for interval 75 in FIG. 7.

Before the inductor current has its zero-crossing, the first controllable switch is set to the on-state again. A control signal 67 is applied to the first controllable switch to set the first controllable switch to the conducting state. The control signal 67 has a rising edge which occurs before the zero crossing of the inductor current. The third capacitor 23 reduces power dissipation when the first controllable switch is switched on at non-zero inductor current.

After the inductor current has its zero crossing and the current path in the inductor reverses, the first capacitance 16 is being discharged. This state is shown in interval 76 in FIG. 7. A current flows from the inductor 13 to the first capacitance 16 to discharge the first capacitance 16. The first capacitance 16 delays conduction through the first diode 14 in this interval. The second capacitance 17 is being charged while the first capacitance 16 is being discharged.

The discharging process of the first capacitance 16 leads to a delay before the first diode 14 enters into conduction after the current direction in the inductor reverses. The voltage drop across the inductor 13, i.e. the voltage between the inductor terminal connected to the controllable switches and the inductor terminal connected to the diodes decreases from $(V_{Bus+}V_{load})/2$ to $(V_{Bus}-V_{load})/2$ while the second capacitance 17 is being discharged in interval 76.

The inductor current continues to increase while the first capacitance 16 is being discharged and the second capacitance 17 is being charged in interval 76. A modulus of the voltage drop $V_L$ across the inductor decreases as the first capacitance 16 is being discharged.

At least for a fraction of interval 76, the voltage across the first capacitance 16 prevents the first diode 14 from entering into conduction.

When the first diode 14 starts to conduct, current flows from the first input terminal 11 through the first controllable switch, the inductor 13, and the first diode 14 to the first output terminal 31 until the first controllable switch is set to its off-state. This state corresponds to interval 77 in FIG. 7. In this state, the voltage drop $V_L$ across the inductor 13 is approximately equal to $(V_{Bus}-V_{load})/2$. The inductor current continues to increase more slowly than in intervals 75 and 76. The first diode 14 may start to conduct when the first capacitance 16 is substantially discharged or when the voltage between the terminals of the first capacitance 16 is less than a pre-defined threshold.

As can best be seen in FIG. 7, the modulus of the time-derivative of the inductor current in interval 77 is less than the modulus of the time-derivative of the inductor current in intervals 75 and 76. In a converter which does not have the first capacitance 16, the inductor current would increase more slowly than as shown for the converter with the first capacitance 16 in FIG. 7 for intervals 75 and 76. The first capacitance 16 increases an amplitude of the inductor current, which leads to a more efficient transfer of current to the output of the converter 10. The amount of charge which is transferred to the output per switching cycle of the first and second controllable switches is increased by the first capacitance 16.

The first controllable switch is set to the off-state at the end of interval 77. The cycle explained with reference to intervals 72 to 77 in FIG. 7 is then repeated. For illustration, when the first controllable switch is set to the off-state, the voltage drop across the inductor decreases and the inductor current decreases, as illustrated for interval 78 in FIG. 7 and as explained with reference to interval 72 above.

The switching frequency at which the first controllable switch is switched may be defined as inverse of the time period between successive switch-on operations or successive switch-off operations of the first switch.

The switching frequency of the first controllable switch may be defined as the inverse of the time period between two successive rising edges or between two successive falling edges of the control signals 65, 67 which are output to the first controllable switch. Similarly, the switching frequency at which the second controllable switch is switched may be defined as inverse of the time period between successive switch-on operations or successive switch-off operations of the second switch. The switching frequency of the second controllable switch may be defined as the inverse of the time period between two successive rising edges or between two successive falling edges of the control signals 66 which are output to the second controllable switch.

The output current which is fed to the light emitting means 9 may be controlled by controlling the switching frequency. An open loop control may be implemented which is independent of any measurement of the output current of the controller. The switching frequency may be set based on one or several voltage measurements, as will be explained with reference to FIG. 9.

Various effects are attained by the converter having the topology and operation explained with reference to FIG. 2 to FIG. 7. The converter allows the output current to be controlled by controlling the switching frequency of the first and second controllable switches. The converter can safely be shorted. The topology and operation provides robustness against short-circuit conditions. This means that no current measurement is required to detect a short-circuit condition. The capacitances which are connected in parallel with the first diode 14 and the second diode 15 may act in a clamped resonant manner and can be chosen in conjunction with the inductance of the inductor 13 to provide a load current through the light emitting means 9 which is nearly constant as a function of load voltage for at least a given range of load voltages.

Figure 8:
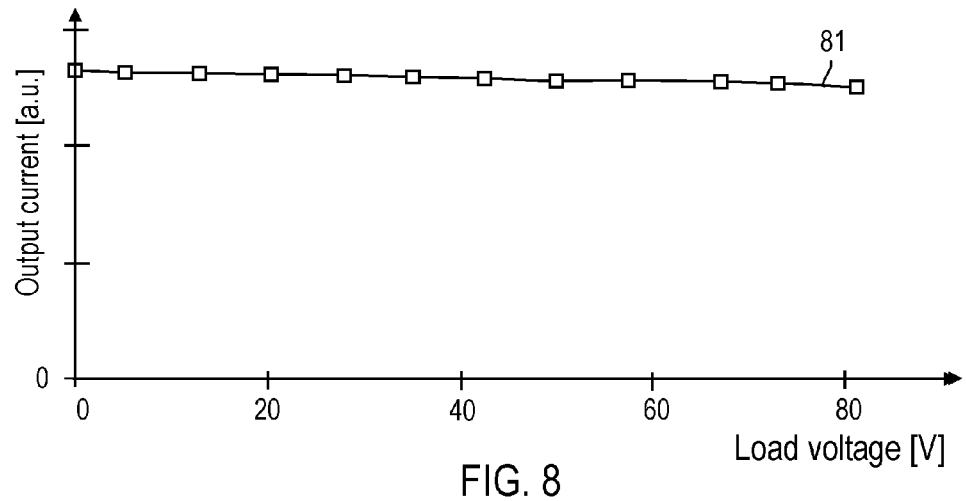
FIG. 8 shows a graphical representation of an output current as a function of load voltage for a converter according to an embodiment.

FIG. 8 illustrates the load current of a converter according to an embodiment as a function of load voltage. The load current depends only weakly on the load voltage for a wide range of load voltages. This is attained by the interplay of the capacitances which are connected in parallel with the first diode 14 and the second diode 15 in conjunction with the inductance of the inductor 13.

The output current of the converter may be controlled by frequency control of the switching frequency. The frequency control of the switching frequency may be performed for at least an interval of target output currents. The switching frequency may be increased to decrease the output current. The control device 20 of the converter 10 may adjust the switching frequency in dependence on a desired target output current. The target output current may be set in accordance with a dim level. The converter 10 may have an interface to receive a command specifying the dim level. The converter 10 may be configured for power line communication. I.e., the converter 10 may be configured to receive a command specifying a dim level over the supply bus 5. The control device 20 of the converter 10 may monitor the supply voltage between the input terminals 11, 12 for modulations. The control device 20 of the converter 10 may decode the modulations of the supply voltage to determine a dim level and may set the switching frequency in accordance with the dim level.

Figure 9:
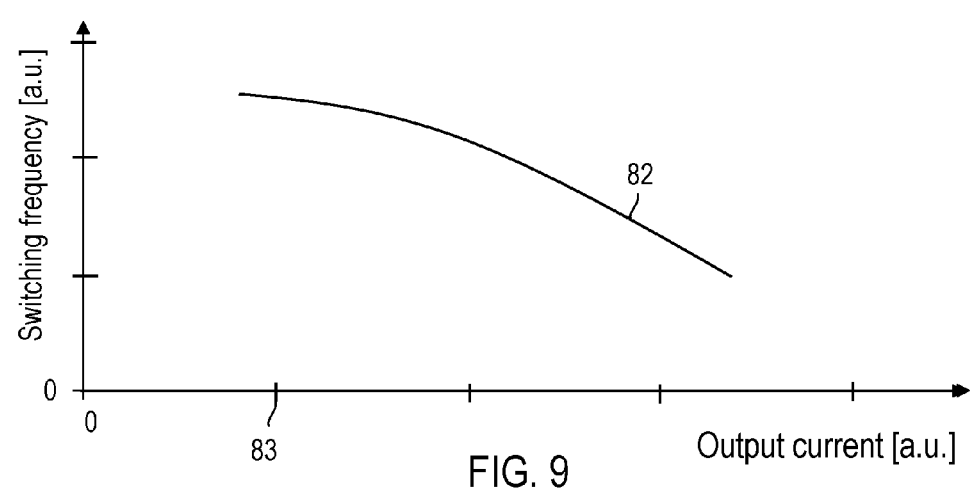
FIG. 9 shows a graphical representation of a switching frequency as a function of target output current for a converter according to an embodiment.

FIG. 9 illustrates how the switching frequency can be chose as a function of the desired output current of the converter. FIG. 9 shows a graph 82 which represents the switching frequency that is set as a function of the target output current. For target output currents greater than a threshold 83, the switching frequency is set as a function of, and varies with, the target output current. A smaller switching frequency is used to obtain a greater output current. The switching frequency may be increased to decrease the output current. The example of FIG. 9 thus shows a variant of non-pulsed operation. As the converter 10 may be implemented as a half-bridge resonance converter it may operate in a resonant mode. The switching frequency of the first controllable switch and of the second controllable switch may set an output current of the converter. The control device 20 may use various techniques to determine the switching frequency. The control device 20 may use a data field and may perform a lookup operation to determine the switching frequency as a function of the output current. The control device 20 may compute the switching frequency by evaluating a formula which depends on the target output current.

In some implementations, the control device 20 may determine the switching frequency such that the switching frequency varies linearly with the target output current. In some implementations, the control device 20 may determine the switching frequency such that the switching frequency varies as a function of output current in a non-linear manner.

For illustration, the control device may set the switching frequency $f_{sw}$ in accordance with $$f_{sw} = a_0 + a_1 \times I_{out} + a_2 \times (I_{out})^2 \qquad (1)$$

where $I_{out}$ denotes the target output current. The coefficients $a_0$, $a_1$, and $a_2$ may be fixed coefficients which may be determined in a calibration procedure.

At least one of the coefficients $a_0$, $a_1$, and $a_2$ in Equation (1) may depend on the bus voltage between the input terminals 11, 12 and/or the load voltage between the output terminals 31, 32. For illustration, the control device 20 may be configured to set the frequency $f_{sw}$ by evaluating $$f_{sw} = A_0 + A_1 \times (I_{out}/V_{Bus}) + A_2 \times (V_{load}/V_{bus}) + A_3 \times (I_{out}/V_{Bus})^2 + A_4 \times (I_{out}/V_{Bus}) \times (V_{load}/V_{bus}) + A_5 \times (V_{load}/V_{bus})^2 \qquad (2)$$

where $V_{Bus}$ denotes the bus voltage between the input terminals 11, 12 and $V_{load}$ denotes the load voltage of the load which can be measured between the output terminals 31, 32 when current is fed to the light emitting means. The coefficients $A_0$, $A_1$, $A_2$, $A_3$, $A_4$, and $A_5$ may be fixed coefficients.

Even when the switching frequency is set in dependence on the bus voltage and/or the load voltage, as explained with reference to Equation (2), no current measurement is required to perform current control. Current control may be implemented as an open loop control, which does not incur the power dissipation and additional costs associated with implementing a current measurement of the output current. The measurement of the bus voltage and/or of the load voltage used for evaluating the right-hand side of Equation (2) does not require costly components and does not lead to significant overhead power dissipation.

The control device 20 of the converter 10 may be configured to operate the first and second controllable switches 21, 22 in a pulsed mode. The control device 20 may switch the first controllable switch 21 and the second controllable switch 22 with a switching frequency in a time period having on-duration $T_{on}$.

Thereafter, both the first controllable switch 21 and the second controllable switch 22 may be kept in the off-state of a time period having a off-duration $T_{off}$. The on-duration $T_{on}$ and/or the off-duration $T_{off}$ may be varied as a function of the target output current, i.e. as a function of dim level. Current is fed to the light emitting means during the time period having on-duration $T_{on}$ in which the first and second controllable switches 21, 22 are switched repeatedly. The time-averaged output current may be adjusted by adjusting the ratio of $T_{on}$ and $(T_{on}+T_{off})$.

The pulsed mode of operation may be selectively employed for dim levels or target output currents which are less than a pre-defined threshold. The switching frequency during the time period with on-duration $T_{on}$ may be kept constant as a function of dim level when the pulsed operation is employed.

Figure 10:
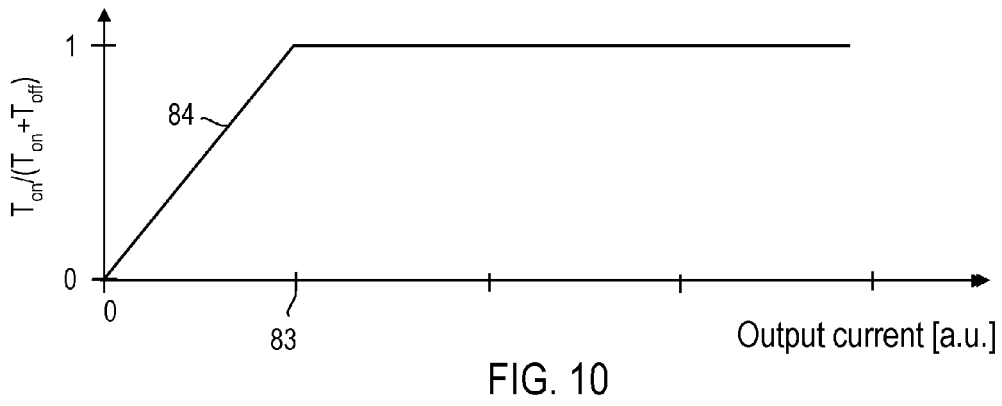
FIG. 10 shows a graphical representation of on- and off-times for a pulsed operation of a converter according to an embodiment.

FIG. 10 illustrates the combination of pulsed operation for target output currents which are less than a threshold 83 and non-pulsed operation for target output currents which are greater than the threshold 83. The non-pulsed operation constitutes the operation with changeable switching frequency which is described with the example of FIG. 9 where the switching frequency is chosen as a function of the desired output current of the converter. Below the threshold 83, the ratio $T_{on}/(T_{on}+T_{off})$ increases with the target output current. The ratio $T_{on}/(T_{on}+T_{off})$ may increase linearly with the target output current. The control device 20 may adjust on-duration $T_{on}$ while keeping $T_{on}+T_{off}$ (the sum of on-duration $T_{on}$ and off-duration $T_{off}$) constant. The control device 20 may select on-duration $T_{on}$ to increase linearly with the target output current when the target output current is less than the threshold 83. For output currents greater than the threshold 83, the first and second controllable switches 21, 22 are switched without any interruption periods in which no switching is performed.

When the target output current is below the threshold (83), the control device (20) may be configured to adjust a length of a first time interval in which it switches the first and second controllable switches and/or a length of a second time interval in which it does not switch the first and second controllable switches as a function of the dim level. The first time interval is the on-duration $T_{on}$.

The second time interval is the off-duration $T_{off}$.

Various modifications of the converter according to embodiments may be implemented in other embodiments.

Figure 11:
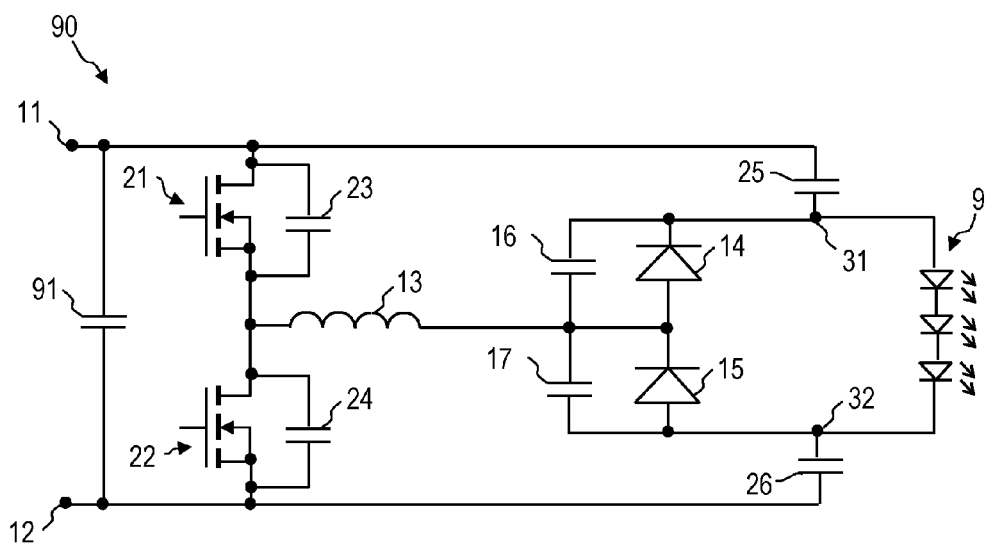
FIG. 11 is a circuit diagram of converter according to another embodiment.

FIG. 11 is a circuit diagram of a converter 90 according to an embodiment in which a capacitor 91 is connected between the first input terminal 11 and the second input terminal 12. An additional capacitor may optionally be connected between the output terminals 31, 32, as explained for capacitor 27 of the converter 10 of FIG. 2 to FIG. 6.

In any one of the embodiments, a diode may be connected in parallel with the capacitor 25 and/or the other capacitor 26 which performs supply decoupling.

Figure 12:
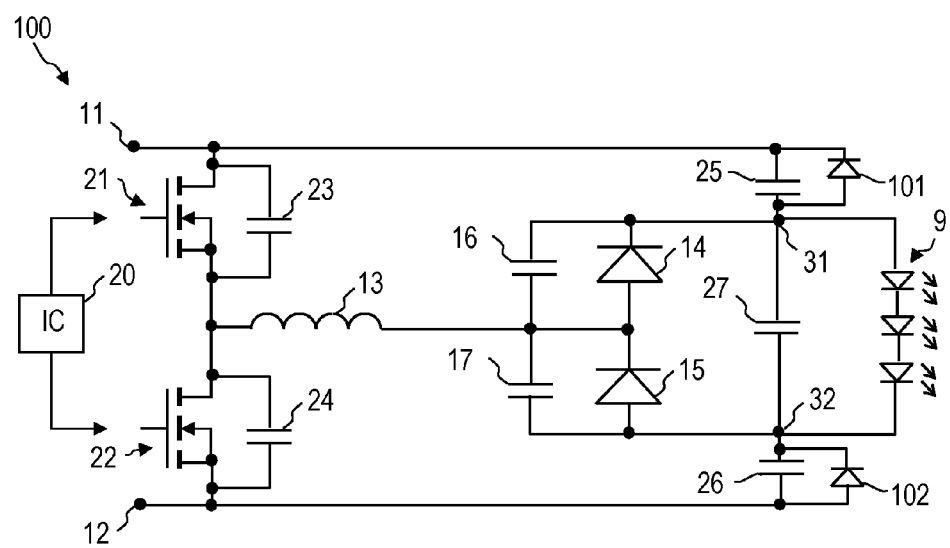
FIG. 12 is a circuit diagram of converter according to another embodiment.

FIG. 12 is a circuit diagram of a converter 100 in which a diode 101 is connected in parallel with the capacitor 25. Another diode 102 is connected in parallel with the other capacitor 26. The diode 101 and the other diode 102 provide over-voltage protection. This guarantees voltage clamping which enables operation of the converter at ELV or SELV potentials.

In any one of the converters described with reference to FIG. 2 to FIG. 12, a symmetric configuration may be chosen in which the first capacitance 16 and the second capacitance 17 may have identical configurations. A configuration may be chosen in which the third capacitance 23 and the fourth capacitance 24 may have identical configurations. A configuration may be chosen in which the capacitance 25 and the other capacitance 26 may have identical configurations.

While embodiments have been described in detail with reference to the drawings, modifications may be implemented in other embodiments.

For illustration rather than limitation, while capacitors may be connected in parallel with the first and second diodes, the capacitances do not need to be implemented by dedicated capacitors. The first and second capacitances may respectively be parasitic capacitances. Similarly, the third capacitance which is connected in parallel with the first controllable switch and/or the fourth capacitance which is connected in parallel with the second controllable switch may be implemented as capacitors or as parasitic capacitances. Similarly, the capacitance 25 and the further capacitance 26 may be implemented as capacitors or as parasitic capacitances.

While embodiments have been described in which commands specifying a dim level are transmitted by power line communication, the converter may have a dedicated interface for receiving control commands and/or for outputting status information.

The converter according to embodiments is operative to operate from voltages which are less than 120 V, for example. The converter is inherently protected from short circuit loads. Current control may be implemented as an open loop control which does not require any current measurements. An optional current measurement may be implemented in order to enable closed loop control or optional safety functions.

Embodiments of the invention may be used in lighting systems. Embodiments of the invention may in particular be used for driver circuits which feed current to inorganic LEDs or OLEDs, without being limited thereto.

The invention claimed is:

1. A converter for supplying current to a light emitting means (8, 9), the converter (6, 7; 10; 90; 100) comprising:
   an input (11, 12) configured to receive a direct current (DC) supply voltage;
   at least a first controllable switch (21; 41, 43) electrically connected between the input (11, 12) and an inductor (13), and a second controllable switch (22; 42, 44) electrically connected between the input (11, 12) and the inductor (13); a first diode (14) and a second diode (15) connected in series; a first capacitance (16) connected in parallel with the first diode (14) and a second capacitance (17) connected in parallel with the second diode (15);
   the inductor (13) having a terminal coupled to the at least one controllable switch (21, 22; 41-44) and another terminal coupled to an anode of the first diode (14) and a cathode of the second diode (15);
   a control device (20) to control the first controllable switch (21; 41, 43) and the second controllable switch (22; 42, 44), wherein the control device (20) is configured to adjust a switching frequency of the first controllable switch (21; 41, 43) and of the second controllable switch (22; 42, 44) to set an output current of the converter (6, 7; 10; 90; 100);
   a first output terminal (31) and a second output terminal (32), through which the output current of the converter (6, 7; 10; 90; 100) flows to the light emitting means (8, 9);
   wherein inductor current has a first current direction in the inductor (13) when current flows from the inductor (13) to the first output terminal (31) through the first diode (14), and wherein the inductor current has a second current direction in the inductor (13) when the current flows from the second output terminal to the inductor (13) through the second diode (15);
   wherein the second capacitance (17) is charged and the first capacitance (16) is discharged when the inductor current has the first current direction in the inductor (13), and wherein the second capacitance (17) is discharged and the first capacitance (16) is charged when the inductor current has the second current direction in the inductor (13); and
   wherein the first output terminal (31) and the second output terminal (32) are arranged such that the light emitting means (8, 9) is connected in parallel to the the first diode (14) and the second diode (15).

2. The converter of claim 1, wherein a cathode of the first diode (14) is coupled to a first output terminal (31) of the converter (6, 7; 10; 90; 100) and an anode of the second diode (15) is coupled to a second output terminal (32) of the converter (6, 7; 10; 90; 100).

3. The converter of claim 1, wherein the second capacitance (17) is configured to drive a discharge current (55) of the second capacitance (17) through the inductor (13) until the second diode (15) starts to conduct after the reversal of the current direction in the inductor (13) from the first current direction to the second current direction.

4. The converter of claim 1, wherein the control device (20) is configured to perform an open loop control to set the output current of the converter (6, 7; 10; 90; 100).

5. The converter of claim 1, wherein the control device (20) is configured to adjust a switching frequency of the first controllable switch (21; 41, 43) and of the second controllable switch (22; 42, 44) as a function of both the direct current supply voltage and a target output current.

6. The converter of claim 1, wherein the control device (20) is configured to selectively control the first controllable switch (21; 41, 43) and the second controllable switch (22; 42, 44) in a pulsed manner when a target output current is below a threshold (83).

7. The converter of claim 6, wherein the control device (20) is configured to increase on-duration (Ton) linearly with the target output current.

8. The converter of claim 6, wherein the control device (20) is configured to respectively switch on the first controllable switch (21; 41, 43) or the second controllable switch (21, 22; 41-44) before a current (61) in the inductor (13) has a zero crossing.

9. The converter of claim 8, further comprising:
a third capacitance (23) connected in parallel with the first controllable switch (21, 22; 41-44) and a fourth capacitance (24) connected in parallel with the second controllable switch (21, 22; 41-44).

10. A system, comprising:
a voltage supply bus (5);
a converter (6, 7; 10; 90; 100) according to claim 1, wherein the input (11, 12) of the converter (6, 7; 10; 90; 100) is connected to the voltage supply bus (5); and
a light emitting means (8, 9) connected to an output (31, 32) of the converter (6, 7; 10; 90; 100).

11. The system of claim 10, wherein the light emitting means (8, 9) comprises at least one light emitting diode.

12. A method of operating a converter (6, 7; 10; 90; 100) for supplying current to a light emitting means (8, 9), wherein the converter (6, 7; 10; 90; 100) comprises an input (11, 12) to receive a direct current (DC) supply voltage, at least one controllable switch (21, 22; 41-44) coupled to the input (11, 12), a first diode (14) and a second diode (15) connected in series, a first capacitance (16) connected in parallel with the first diode (14) and a second capacitance (17) connected in parallel with the second diode (15), an inductor (13) having a terminal coupled to the at least one controllable switch (21, 22; 41-44) and another terminal coupled to an anode of the first diode (14) and a cathode of the second diode (15), and a first output terminal (31) and a second output terminal (32), through which the output current of the converter (6, 7; 10; 90, 100) flows to the light emitting means (8, 9), wherein the method comprises:
controlling the switching frequency of the at least one controllable switch (21, 22; 41-44) to transfer current between the input (11, 12) and the output through the inductor (13) and at least one of the first diode (14) and the second diode (15),
wherein inductor current has a first current direction in the inductor (13) when current flows from the inductor (13) to the first output terminal (31) through the first diode (14), and wherein the inductor current has a second current direction in the inductor (13) when the current flows from the second output terminal to the inductor (13) through the second diode (15);
wherein the second capacitance (17) is charged and the first capacitance (16) is discharged when the inductor current has the first current direction in the inductor (13), and wherein the second capacitance (17) is discharged and the first capacitance (16) is charged when the inductor current has the second current direction in the inductor (13); and
wherein the first output terminal (31) and the second output terminal (32) are arranged such that the light emitting means (8, 9) is connected in parallel to the the first diode (14) and the second diode (15).

* * * * *